(12) United States Patent
Lambert et al.

(10) Patent No.: US 11,630,898 B2
(45) Date of Patent: Apr. 18, 2023

(54) SYSTEMS AND METHODS FOR PROVIDING SECURE LOGIC DEVICE AUTHENTICATION, UPDATE, AND RECOVERY

(71) Applicant: Dell Products L.P., Round Rock, TX (US)

(72) Inventors: Timothy M. Lambert, Austin, TX (US); Milton Olavo Decarvalho Taveira, Round Rock, TX (US); Jeffrey L. Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 323 days.

(21) Appl. No.: 17/132,783

(22) Filed: Dec. 23, 2020

(65) Prior Publication Data

US 2022/0198016 A1 Jun. 23, 2022

(51) Int. Cl.
*G06F 21/57* (2013.01)
*G06F 8/65* (2018.01)
*G06F 12/14* (2006.01)
*G06F 21/44* (2013.01)

(52) U.S. Cl.
CPC .............. *G06F 21/572* (2013.01); *G06F 8/65* (2013.01); *G06F 12/1433* (2013.01); *G06F 21/44* (2013.01); *G06F 2212/1052* (2013.01); *G06F 2221/033* (2013.01)

(58) Field of Classification Search
CPC .... G06F 12/1433; G06F 21/44; G06F 21/572; G06F 2212/1052; G06F 2221/033; G06F 8/65; G06F 9/44
See application file for complete search history.

(56) References Cited

U.S. PATENT DOCUMENTS

| 2014/0359183 | A1* | 12/2014 | Paek | G06F 21/55 |
| | | | | 711/146 |
| 2019/0327098 | A1* | 10/2019 | Hart | H04L 9/3073 |
| 2021/0312055 | A1* | 10/2021 | Kloth | G06F 21/64 |

* cited by examiner

*Primary Examiner* — Terrell S Johnson
(74) *Attorney, Agent, or Firm* — Jackson Walker L.L.P.

(57) ABSTRACT

An information handling system may include a host system comprising a host system processor, a logic device configured to perform a functionality of the information handling system in accordance with code stored on non-transitory computer-readable media of the logic device, and a management controller communicatively coupled to the host system processor and the logic device and configured to perform out-of-band management of the information handling system. The management controller may be further configured to: during a boot of the management controller, perform an initial authentication of the code via an immutable interface of the logic device, after the initial authentication and prior to completion of boot of the management controller, enable a hardware lock to prevent write access to the logic device via the immutable interface, and in response to a power on request of the host system, perform a second authentication of the code via a mutable interface of the logic device.

21 Claims, 3 Drawing Sheets

SYSTEMS AND METHODS FOR PROVIDING SECURE LOGIC DEVICE AUTHENTICATION, UPDATE, AND RECOVERY

TECHNICAL FIELD

The present disclosure relates in general to information handling systems, and more particularly to methods and systems for providing secure authentication, update, and recovery of a logic device within an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use logic devices, such as complex programmable logic devices (CPLDs) and field-programmable gate arrays (FPGAs) for various purposes, including without limitation orchestrating power and/or boot sequences, resets, fault aggregation, error handling, voltage regulation, power control, and security. However, many existing low- to medium-complexity logic devices lack security features such as support for cryptographic authentication of their configuration code and settings, secure updates, power on/boot and run-time cryptographic authentication, locking of configuration updates, and secure recovery. A lack of cryptographic authentication may allow a possibility that non-authentic program code may execute without detection and provide no assurance that code originates from a known, safe source. Negative consequences may result from a compromised logic device, including without limitation a denial of service, an information handling system rendered unusable or unstable, permanent electrical damage, bypassed security features, and persistent non-recoverable attacks.

SUMMARY

In accordance with the teachings of the present disclosure, the disadvantages and problems associated with ensuring secure authentication, update, and recovery for a logic device in an information handling system may be reduced or eliminated.

In accordance with embodiments of the present disclosure, an information handling system may include a host system comprising a host system processor, a logic device configured to perform a functionality of the information handling system in accordance with code stored on non-transitory computer-readable media of the logic device, and a management controller communicatively coupled to the host system processor and the logic device and configured to perform out-of-band management of the information handling system. The management controller may be further configured to: during a boot of the management controller, perform an initial authentication of the code via an immutable interface of the logic device, after the initial authentication and prior to completion of boot of the management controller, enable a hardware lock to prevent write access to the logic device via the immutable interface, and in response to a power on request of the host system, perform a second authentication of the code via a mutable interface of the logic device.

In accordance with these and embodiments of the present disclosure, a method may include, in an information handling system comprising a host system comprising a host system processor and a logic device configured to perform a functionality of the information handling system in accordance with code stored on non-transitory computer-readable media of the logic device: during a boot of a management controller communicatively coupled to the host system processor and the logic device and configured to perform out-of-band management of the information handling system, performing, by the management controller, an initial authentication of the code via an immutable interface of the logic device; after the initial authentication and prior to completion of boot of the management controller, enabling, by the management controller, a hardware lock to prevent write access to the logic device via the immutable interface; and in response to a power on request of the host system, performing, by the management controller, a second authentication of the code via a mutable interface of the logic device.

In accordance with these and embodiments of the present disclosure, an article of manufacture may include a non-transitory computer-readable medium and computer-executable instructions carried on the computer-readable medium, the instructions readable by a processing device, the instructions, when read and executed, for causing the processing device to, in an information handling system comprising a host system comprising a host system processor and a logic device configured to perform a functionality of the information handling system in accordance with code stored on non-transitory computer-readable media of the logic device: during a boot of a management controller communicatively coupled to the host system processor and the logic device and configured to perform out-of-band management of the information handling system, perform, by the management controller, an initial authentication of the code via an immutable interface of the logic device; after the initial authentication and prior to completion of boot of the management controller, enable, by the management controller, a hardware lock to prevent write access to the logic device via the immutable interface; and in response to a power on request of the host system, perform, by the management controller, a second authentication of the code via a mutable interface of the logic device.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
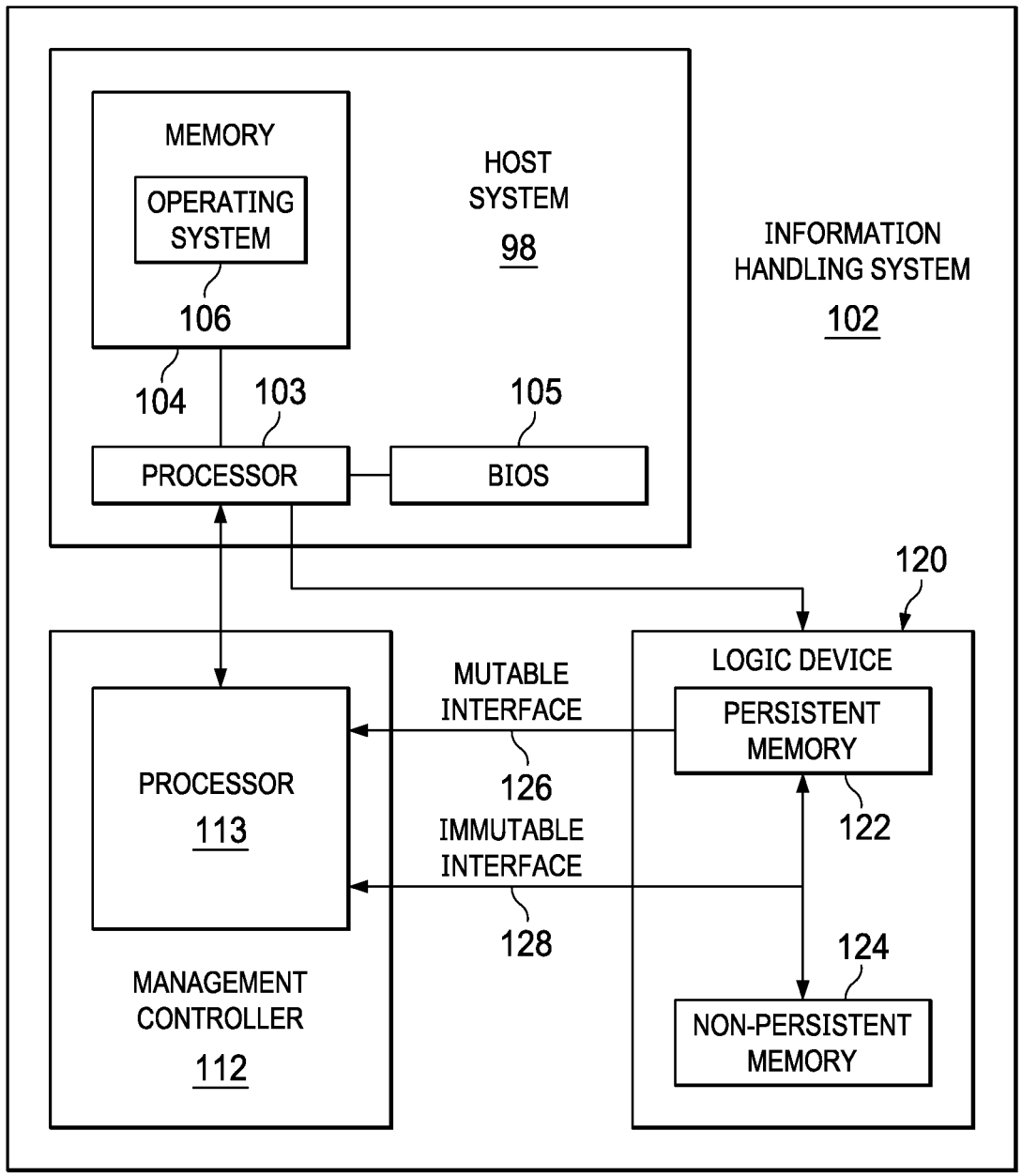
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output system (BIOS) 105 communicatively coupled to processor 103, a management controller 112 communicatively coupled to processor 103, and a logic device 120 communicatively coupled to processor 103 and management controller 112. In operation, processor 103, memory 104, and BIOS 105 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface. Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be stored on a read-only memory of information handling system 102 and which may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Management controller 112 may be configured to provide management facilities for management of information handling system 102. Such management may be made by management controller 112 even if information handling system 102 is powered off or powered to a standby state.

Management controller 112 may include a processor 113 communicatively coupled to processor 103. Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in computer-readable media of information handling system 102 or management controller 112. As shown in FIG. 1, processor 113 may be communicatively coupled to processor 103. Such coupling may be via a Universal Serial Bus (USB), System Management Bus (SMBus), general purpose input/output (GPIO) channel and/or one or more other communications channels.

A logic device 120 may comprise any suitable system, device, or apparatus that may perform a specialized function that extends the functionality of information handling system 102. For example, logic device 120 may comprise a CPLD or FPGA. As shown in FIG. 1, logic device 120 may comprise a persistent memory 122 and a non-persistent memory 124. Persistent memory 122 may include a computer-readable storage medium that may retain data or instructions after power is removed from persistent memory 122. For example, persistent memory 122 may comprise flash memory that stores data and instructions to be loaded and executed by a processing device of logic device 120. Non-persistent memory 124 may include a computer-readable storage medium that may not retain data or instructions after power is removed from non-persistent memory 124. For example, non-persistent memory 124 may include a static random access memory storing instructions and data already loaded from persistent memory 122 and actively being processed by a processing device of logic device 120.

Figure 2:
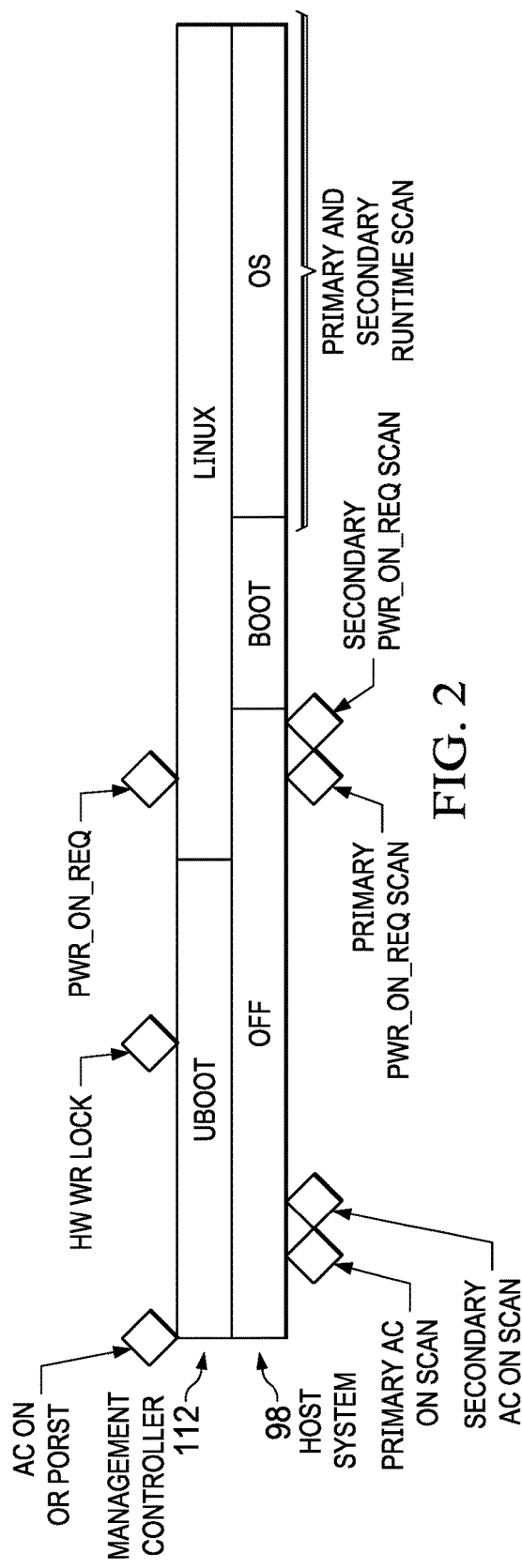
FIG. 2 illustrates a timing diagram depicting secure initial and runtime authentication of a logic device, in accordance with embodiments of the present disclosure.

As also shown in FIG. 1, logic device 120 may be coupled to management controller 122 by each of a mutable interface 126 and an immutable interface 128. Logic devices such as logic device 120 may include a native port that provides direct access to persistent memory 122 and non-persistent memory 124 without relying on user or mutable logic for access. Such a path may be known as an immutable path and may include an immutable interface. When a path to internal configuration of a logic device depends on user logic, then such path may be referred to as a mutable path and may include a mutable interface. Mutable paths may be faster and may also be configured as read-only, unlike immutable paths which may be read and write capable. FIG. 2 illustrates a timing diagram depicting secure initial and runtime authentication of logic device 120, in accordance with embodiments of the present disclosure. As shown in FIG. 2, after initial power on (AC on) or power on request (PORST) of management controller 112, boot firmware (e.g., Uboot) of management controller 112 may perform a scan (Primary AC on Scan) of persistent memory 122 and non-persistent memory 124 via immutable interface 128, before particular functions (e.g., a web server) of management controller 112 are enabled, in order to minimize potential malicious interference. Immediately following such scan, management controller 112 may implement a hardware-based lock (HW WR lock) on the path comprising immutable interface 128 (e.g., with an appropriate hardware switch or other circuit preventing writes to or modification of persistent memory 122 and non-persistent memory 124) before the end of execution of the boot firmware of management controller 112. In addition, upon a boot of host system 98 (e.g., following a power on request of host system 98, indicated as PWR_ON_REQ in FIG. 2), operating system firmware (e.g., LINUX) of management controller 112 may perform a scan (Primary PWR_ON_REQ Scan) of persistent memory 122 via mutable interface 126, which may be a trusted, secure, read-only path. Furthermore, management controller 112 may perform additional scans of persistent memory 122 via mutable interface 126 during runtime of host system 98.

In the event of a failure of any of these scans, management controller 112 may perform an automatic recovery to images stored in persistent memory 122 in response to any failure of any initial scan or scan in response to powering on of host system 98, or queue a recovery to occur on a subsequent boot of host system 98 in response to a runtime scan failure.

Figure 3:
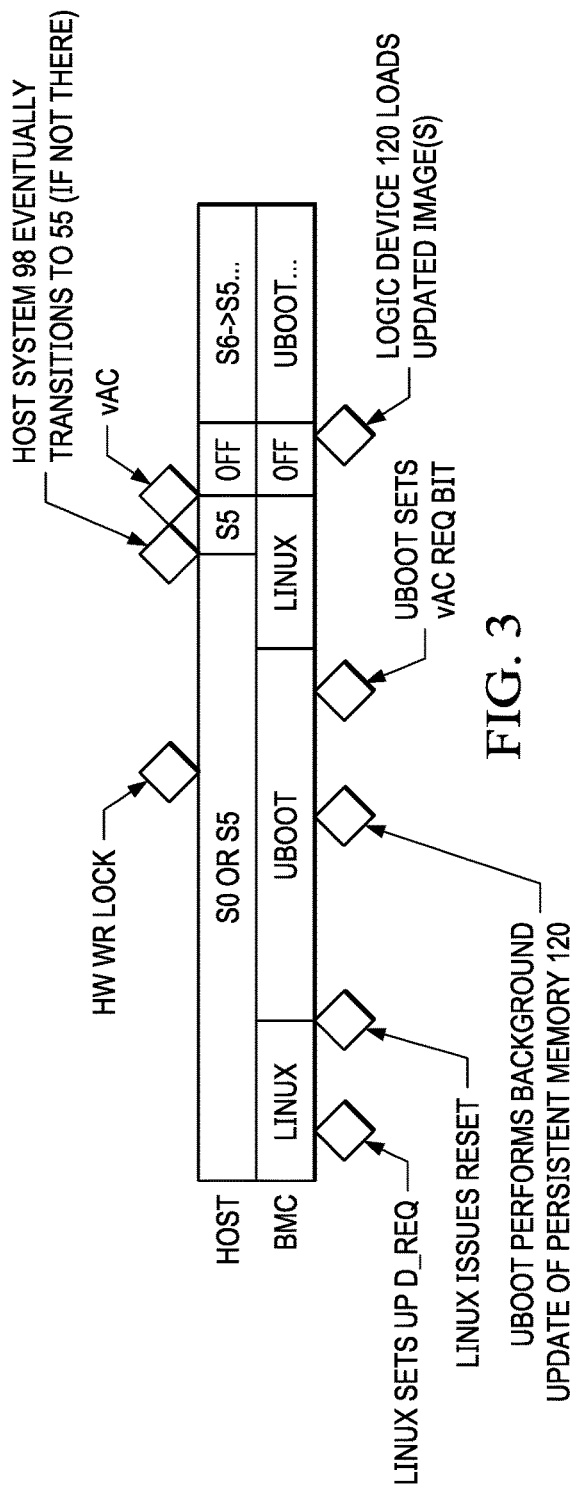
FIG. 3 illustrates a timing diagram depicting secure update of a logic device, in accordance with embodiments of the present disclosure.

FIG. 3 illustrates a timing diagram depicting secure update of logic device 120, in accordance with embodiments of the present disclosure. As shown in FIG. 3, operating system firmware (e.g., LINUX) of management controller 112 may set an update request (UPD_REQ) flag, after which the operating system firmware may issue a reset to reboot management controller 112 to its boot firmware (e.g., Uboot). After such initialization fo boot firmware of management controller 112, boot firmware (e.g., Uboot) of management controller 112 may perform a background update of persistent memory 122 via immutable interface 128. Immediately following such update, management controller 112 can implement a hardware-based lock (HW WR lock) on the path comprising immutable interface 128 (e.g., with an appropriate hardware switch or other circuit preventing writes to or modification of persistent memory 122 and non-persistent memory 124) before the end of execution of the boot firmware of management controller 112. Also prior to the end of the boot firmware of management controller 112, the boot firmware may set a flag (vAC req bit) to perform a core reset of information handling system 102. After a period of time, host system 98 may eventually transition to a powered off state (e.g., S5) if not already in such state), and a core reset of information handling system 102 may occur (e.g., vAC). Upon such core reset, logic device 120 may reload the updated image(s) from persistent memory 122 and execute the updated image(s).

In addition to supporting authentication, update, and recovery for a single logic device 120 as shown in FIG. 1, systems and methods similar to those described above may also be extensible to additional logic devices in a chain of trust.

Figure 4:
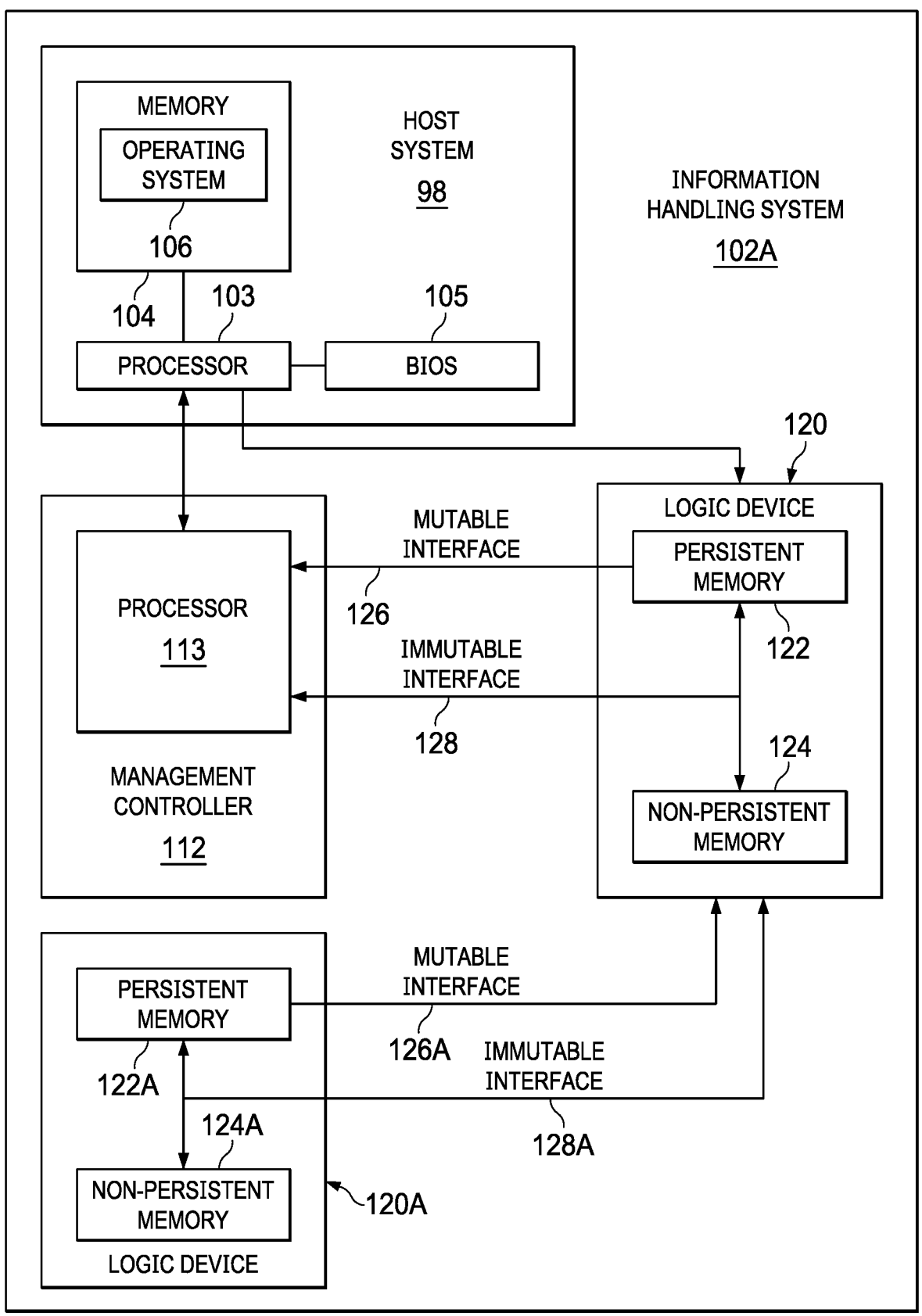
FIG. 4 illustrates a block diagram of another example information handling system, in accordance with embodiments of the present disclosure.

FIG. 4 illustrates a block diagram of an example information handling system 102A, in accordance with embodiments of the present disclosure. Information handling system 102A may be similar to information handling system 102 except that information handling system 102A may include a secondary logic device 120A coupled to logic device 120 via a mutable interface 126A and an immutable interface 128A, such that logic device 120 is interfaced between management controller 112 and logic device 120A. Management controller 112 may access secondary logic device 120A via mutable interface 126 of primary logic device 120 which may be, as described above, authenticated via immutable interface 128. Returning to FIG. 2, management controller 112 may perform a scan (Secondary AC on Scan) of persistent memory 122A and non-persistent memory 124A via immutable interface 128A, after performing the scan (Primary AC on Scan) of logic device 102 and before particular functions (e.g., a web server) of management controller 112 are enabled, in order to minimize potential malicious interference. Similarly, management controller 112 may perform scans (Secondary PWR_ON_REQ scan and secondary runtime scan) of persistent memory 122A via mutable interface 126A. Accordingly, a secure chain of trust may be extended through multiple logic devices.

The systems and methods described herein may enable recovery of a logic device by decoupling boot of a management controller from a logic device. Further, these systems and methods described herein may extend a hardware root of trust for a management controller into one or more logic devices. In addition, by performing an immutable scan, update, and recovery of a logic device before the end of execution of boot firmware of a management controller, the logic device may be secured from runtime compromise of the management controller. Further, the systems and methods described herein may provide for an out-of-band update to an image stored on a logic device with delaying of blocking boot of a host system.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a host system comprising a host system processor;
   a logic device configured to perform a functionality of the information handling system in accordance with code stored on non-transitory computer-readable media of the logic device; and
   a management controller communicatively coupled to the host system processor and the logic device and configured to perform out-of-band management of the information handling system, and further configured to:
   during a boot of the management controller, perform an initial authentication of the code via an immutable interface of the logic device;
   after the initial authentication and prior to completion of boot of the management controller, enable a hardware lock to prevent write access to the logic device via the immutable interface; and
   in response to a power on request of the host system, perform a second authentication of the code via a mutable interface of the logic device.

2. The information handling system of claim 1, wherein the management controller is further configured to perform a runtime authentication of the code via the mutable interface of the logic device during runtime of an operating system of the host system.

3. The information handling system of claim 2, wherein the management controller is further configured to queue a recovery of the code on a subsequent power on request of the host system in response to failure of the runtime authentication of the code.

4. The information handling system of claim 1, wherein the management controller is further configured to perform an automatic recovery of the code in response to one or both of a failure of the initial authentication of the code or the second authentication of the code.

5. The information handling system of claim 1, wherein the management controller is further configured to, during the boot of the management controller, perform an update of the code via the immutable interface of the logic device.

6. The information handling system of claim 1, further comprising a second logic device communicatively coupled to the logic device such that the logic device is communicatively interfaced between the management controller and the second logic device, and wherein the management controller is configured to:
during a boot of the management controller, perform an initial authentication of second code of the second logic device via the mutable interface of the logic device and a second immutable interface of the second logic device;
after the initial authentication and prior to completion of boot of the management controller, enable, via the mutable interface of the logic device, a second hardware lock to prevent write access to the second logic device via the second immutable interface; and
in response to a power on request of the host system, perform a second authentication of the second code via the mutable interface of the logic device and a second mutable interface of the second logic device.

7. The information handling system of claim 6, wherein the management controller is further configured to perform a runtime authentication of the second code via the mutable interface of the logic device and the second mutable interface of the second logic device during runtime of the operating system of the host system.

8. A method comprising, in an information handling system comprising a host system comprising a host system processor and a logic device configured to perform a functionality of the information handling system in accordance with code stored on non-transitory computer-readable media of the logic device:
during a boot of a management controller communicatively coupled to the host system processor and the logic device and configured to perform out-of-band management of the information handling system, performing, by the management controller, an initial authentication of the code via an immutable interface of the logic device;
after the initial authentication and prior to completion of boot of the management controller, enabling, by the management controller, a hardware lock to prevent write access to the logic device via the immutable interface; and
in response to a power on request of the host system, performing, by the management controller, a second authentication of the code via a mutable interface of the logic device.

9. The method of claim 8, the method further comprising performing, by the management controller, a runtime authentication of the code via the mutable interface of the logic device during runtime of an operating system of the host system.

10. The method of claim 9, further comprising queuing, by the management controller, a recovery of the code on a subsequent power on request of the host system in response to failure of the runtime authentication of the code.

11. The method of claim 8, further comprising performing, by the management controller, an automatic recovery of the code in response to one or both of a failure of the initial authentication of the code or the second authentication of the code.

12. The method of claim 8, further comprising, during the boot of the management controller, performing, by the management controller, an update of the code via the immutable interface of the logic device.

13. The method of claim 8, wherein the information handling system further comprises a second logic device communicatively coupled to the logic device such that the logic device is communicatively interfaced between the management controller and the second logic device, the method further comprising:
during a boot of the management controller, performing, by the management controller, an initial authentication of second code of the second logic device via the mutable interface of the logic device and a second immutable interface of the second logic device;
after the initial authentication and prior to completion of boot of the management controller, enabling, by the management controller and via the mutable interface of the logic device, a second hardware lock to prevent write access to the second logic device via the second immutable interface; and
in response to a power on request of the host system, performing, by the management controller, a second authentication of the second code via the mutable interface of the logic device and a second mutable interface of the second logic device.

14. The method of claim 13, further comprising performing, by the management controller, a runtime authentication of the second code via the mutable interface of the logic device and the second mutable interface of the second logic device during runtime of the operating system of the host system.

15. An article of manufacture comprising:
a non-transitory computer-readable medium; and
computer-executable instructions carried on the computer-readable medium, the instructions readable by a processing device, the instructions, when read and executed, for causing the processing device to, in an information handling system comprising a host system comprising a host system processor and a logic device configured to perform a functionality of the information handling system in accordance with code stored on non-transitory computer-readable media of the logic device:
during a boot of a management controller communicatively coupled to the host system processor and the logic device and configured to perform out-of-band management of the information handling system, perform, by the management controller, an initial authentication of the code via an immutable interface of the logic device;
after the initial authentication and prior to completion of boot of the management controller, enable, by the management controller, a hardware lock to prevent write access to the logic device via the immutable interface; and in response to a power on request of the host system, perform, by the management controller, a second authentication of the code via a mutable interface of the logic device.

16. The article of claim 15, the instructions for further causing the processing device to perform, by the management controller, a runtime authentication of the code via the mutable interface of the logic device during runtime of an operating system of the host system.

17. The article of claim 16, the instructions for further causing the processing device to queue, by the management controller, a recovery of the code on a subsequent power on request of the host system in response to failure of the runtime authentication of the code.

18. The article of claim 15, the instructions for further causing the processing device to perform, by the management controller, an automatic recovery of the code in response to one or both of a failure of the initial authentication of the code or the second authentication of the code.

19. The article of claim 15, the instructions for further causing the processing device to, during the boot of the management controller, perform, by the management controller, an update of the code via the immutable interface of the logic device.

20. The article of claim 15, wherein the information handling system further comprises a second logic device communicatively coupled to the logic device such that the logic device is communicatively interfaced between the management controller and the second logic device, the instructions for further causing the processing device to:

during a boot of the management controller, perform, by the management controller, an initial authentication of second code of the second logic device via the mutable interface of the logic device and a second immutable interface of the second logic device;

after the initial authentication and prior to completion of boot of the management controller, enable, by the management controller and via the mutable interface of the logic device, a second hardware lock to prevent write access to the second logic device via the second immutable interface; and in response to a power on request of the host system, perform, by the management controller, a second authentication of the second code via the mutable interface of the logic device and a second mutable interface of the second logic device.

21. The article of claim 20, the instructions for further causing the processing device to perform, by the management controller, a runtime authentication of the second code via the mutable interface of the logic device and the second mutable interface of the second logic device during runtime of the operating system of the host system.

* * * * *